(12) United States Patent
Kamphenkel et al.

(10) Patent No.: US 9,038,089 B2
(45) Date of Patent: May 19, 2015

(54) METHOD AND APPARATUS FOR GENERATING METADATA FOR DIGITAL CONTENT

(71) Applicant: Thomson Licensing, Issy de Moulineaux (FR)

(72) Inventors: Oliver Kamphenkel, Lehrte (DE); Oliver Theis, Kalletal (DE); Ralf Koehler, Hannover (DE)

(73) Assignee: Thomson Licensing, Boulogne, Billancourt (FR)

( * ) Notice: Subject to any disclaimer, the term of this patent is extended or adjusted under 35 U.S.C. 154(b) by 163 days.

(21) Appl. No.: 13/684,621

(22) Filed: Nov. 26, 2012

(65) Prior Publication Data
US 2013/0139171 A1    May 30, 2013

(30) Foreign Application Priority Data

Nov. 30, 2011    (EP) .................................... 11306589

(51) Int. Cl.
*G06F 9/46* (2006.01)
*G06F 15/173* (2006.01)
*G06F 9/50* (2006.01)
*G06T 1/20* (2006.01)

(52) U.S. Cl.
CPC ... *G06F 9/50* (2013.01); *G06T 1/20* (2013.01); *G06T 2200/24* (2013.01)

(58) Field of Classification Search
None
See application file for complete search history.

(56) References Cited

U.S. PATENT DOCUMENTS

| 5,410,696 | A * | 4/1995 | Seki et al. .................... 717/149 |
| 7,760,203 | B1 | 7/2010 | Hao et al. |
| 7,769,244 | B2 | 8/2010 | Kozlov et al. |
| 2006/0267997 | A1 * | 11/2006 | Walls et al. ................... 345/581 |
| 2007/0143814 | A1 * | 6/2007 | Han .............................. 725/134 |
| 2009/0064168 | A1 * | 3/2009 | Arimilli et al. ............... 718/105 |
| 2009/0178078 | A1 * | 7/2009 | Daigle et al. ................... 725/40 |
| 2009/0276822 | A1 * | 11/2009 | Yamane ......................... 725/118 |
| 2010/0223649 | A1 | 9/2010 | Suitts et al. |
| 2011/0041136 | A1 * | 2/2011 | Messier et al. ............... 718/105 |
| 2012/0096069 | A1 * | 4/2012 | Chan ............................ 709/203 |
| 2013/0013328 | A1 * | 1/2013 | Donovan et al. ................. 705/2 |
| 2013/0050063 | A1 * | 2/2013 | Poornachandran et al. ... 345/2.1 |

FOREIGN PATENT DOCUMENTS

| EP | 1717755 A2 | 11/2006 |
| EP | 2485190 | 8/2012 |
| WO | WO9940724 | 8/1999 |

(Continued)

OTHER PUBLICATIONS

Buyya R; "Parmon: A Portable and Scalable Monitoring System for Clusters", Software Practice & Experience, Wiley & Sons, Bognor Regis, GB, vol. 30, No. 7. Jun. 1. 2000, pp. 1-17.

(Continued)

*Primary Examiner* — Adam Lee
(74) *Attorney, Agent, or Firm* — Jeffrey D. Carter

(57) ABSTRACT

A method and an apparatus for generating metadata for digital content are described, which allow to review the generated metadata already in course of ongoing generation of metadata. The metadata generation is split into a plurality of processing tasks, which are allocated to two or more processing nodes. The metadata generated by the two or more processing nodes is gathered and visualized on an output unit.

26 Claims, 7 Drawing Sheets

(56) References Cited

FOREIGN PATENT DOCUMENTS

| WO | WO2008131520 | 11/2008 |
|----|--------------|---------|
| WO | WO2012065759 | 5/2012  |

OTHER PUBLICATIONS

Haynes Ret al: "A visualization tool for analyzing cluster performance data", Proceedings. IEEE International Conference on Cluster Computingcluster~XX, XX~Oct. 8, 2001, pp. 295-302.

Laccetti G et al: "Parallel/Distributed Film Line Scratch Restoration by Fusion Techniques", Apr. 28, 2004, Computational Science and Its Applications A ICCSA 2004: pp. 525-535.

Oliver Theis et al: "Automatic Film Restoration: Metadata Driven Detection and Removal of Scratch and Dirt", 14th ITG Conference on Electronic Media Technology (CEMT), Mar. 23, 2011, XP55023139, Piscataway, NJ, USA.

Collura F et al: "An Interactive Distributed Environment for Digital Film Restoration" Apr. 28, 2004, Computational Science and its Applications A ICCSA 2004; [Lecture Notes in Computer Science;;LNCS], Springer-Verlag.

Weil F et al: "Dynamic Intelligent Scheduling and Control of Reconfigurable Parallel Architectures for Computer Vision/Image Processing", Journal of Parallel and Distributed.

The European Search Report dated Apr. 11, 2012.

Schallauer et al., "Automatic quality analysis for film and video restoration", 2007 IEEE International Conference on Image Processing, San Antonio, Texas, USA, Sep. 16, 2007, pp. 1-4.

\* cited by examiner

METHOD AND APPARATUS FOR GENERATING METADATA FOR DIGITAL CONTENT

This application claims the benefit, under 35 U.S.C. §119 of EP Patent Application 11306589.0, filed 30 Nov. 2011.

FIELD OF THE INVENTION

The invention relates to a method and an apparatus for generating metadata for digital content, like digital image sequences. More specifically, a method and an apparatus for generating metadata for digital content are described, which allow to review the generated metadata already in course of ongoing generation of metadata.

BACKGROUND OF THE INVENTION

Motion picture films are part of our cultural heritage. Unfortunately, they are often affected by undesirable objects such as scratches, dust, dirt, stains, abrasion and some more. These usually come from the technical process of developing, handling, storing, and screening or scanning the film footage. In some rare cases static objects may already be induced during capturing, for example fluff within a lens or dirt on a scanner glass. In the following all these defects will be simply referred to as 'scratch and dirt'.

Scratch and dirt reduce the quality and the joy of film watching. This is, in most cases, not because a significant amount of visual information is lost. Actually, the opposite is true, scratch and dirt provide an extra amount of information, although it is entirely irrelevant. The human brain is very effective at substituting missing relevant information, based on its daily experience of vision. But its experience of how physical things in this world usually look and behave is constantly violated when viewing affected footage. For example, dirt deposited on the film during scanning or screening appears in one frame and disappears in the other. This contradicts human experience about objects usually appearing, moving, and disappearing smoothly and causes the brain to treat the abnormal visual stimulus exceptionally. Separating relevant and irrelevant information in this way is therefore stressful and tiring for the viewer. Removal of scratch and dirt is required to keep viewers relaxed and focused on the content and is, therefore, an important part of any restoration process.

Preferably restoration is carried out digitally after scanning. Although there are wet scanning techniques, which feed the material through a chemical cleansing process to reduce dirt and potential scratches before scanning, they are not used widely due to a number of technical problems which make them quite costly. In addition, a lot of footage has already been scanned and archived digitally on tape.

Apparently manual restoration of digitized films by finding and removing each scratch and dirt object is a time consuming business, although there is software on the market that assists artists in many aspects of the job. In particular, manual restoration of old content with large amounts of either scratch or dirt may not be financially viable. This is even more the case for large archives with footage of unknown commercial value.

The application of automatic restoration software with algorithms that try to detect and remove scratch and dirt is the only viable alternative to a manual process. At present there are a number of software and hardware products available on the market which perform detection and removal of scratch and dirt more or less automatically. Usually a manual adjustment of certain parameters is needed to fine tune detection and removal, sometimes individually for each scene.

After processing, the restored output or parts thereof have to be either accepted or rejected, with the option of rerunning restoration with different parameters. This is unsatisfactory since the adjustment takes time and quality may be not good enough in critical scenes that have not been specially adapted. Detection of scratch and dirt is a nontrivial problem that is currently not totally solved. There is still a certain ratio of objects that will either not be detected or falsely detected.

Recently it has been proposed to separate the restoration process into detection of objects, e.g. scratch and dirt objects, and removal using an automatic metadata driven workflow. In other words, in a first step artifacts are detected and information about the detected artifacts is stored in a metadata database. The stored metadata is then reviewed by an operator before in a second step the detected artifacts are removed from the images based on the information stored in the metadata database. A drawback of this approach is that the review cannot be started until the detection process has been completed.

SUMMARY OF THE INVENTION

It is thus an object of the present invention to propose a method for generating metadata for digital content, which allows to review the generated metadata before the complete digital content has been analyzed.

According to the invention, a method for generating metadata for digital content comprises the steps of:
- splitting metadata generation into a plurality of processing tasks;
- allocating two or more processing tasks of the plurality of processing tasks to two or more processing nodes;
- gathering metadata generated by the two or more processing nodes; and
- visualizing the gathered metadata on an output unit Accordingly, an apparatus for generating metadata for digital content comprises:
- a processor for splitting metadata generation into a plurality of processing tasks and for allocating two or more processing tasks of the plurality of processing tasks to two or more processing nodes;
- a data collector for gathering metadata generated by the two or more processing nodes; and
- a visualization controller for visualizing the gathered metadata on an output unit.

The solution according to the invention solves the problem of instantaneous metadata processing and reviewing by distributing the necessary processing of the digital content to a plurality of processing nodes, e.g. in a network cloud. The results obtained by the processing nodes are then gathered and visualized at a central node. In this way the digital content and the generated metadata can be either played back (up to processing speed) with annotations or independently reviewed while processing continues in the background. As processing of digital content and generation of appropriate metadata sometimes is extremely complex and time-consuming, either because of extensive content or complicated processing algorithms, distribution of the processing tasks to a plurality of processing nodes allows to save time by making the metadata available sufficiently fast to allow a concurrent reviewing. Also, if processing needs a setup of parameters, different settings can be tested very quickly.

Advantageously, the gathered metadata are post-processed. As the processing nodes only work on a small part of the digital content, post-processing of the gathered metadata allows to consider larger parts of the digital content or even the complete digital content. Of course, also a manual navigation through the gathered metadata and/or the digital content is suitable for reviewing the generated metadata.

Favorably, further processing tasks are allocated to a processing node depending on its reported status. When a processing node signals that it has completed its allocated processing tasks, this processing node is available for further processing. It is thus ensured that all processing nodes operate continuously.

Preferably, in addition to the gathered metadata also the allocation of processing tasks and/or a current processing status of the allocated processing tasks are visualized. This allows to perform an extensive tracking of the distributed processing concurrently to the processing.

Favorably, the visualization of the gathered metadata is updated when further metadata are retrieved, the visualization of the allocation of processing tasks is updated when further processing tasks are allocated, or the visualization of the current processing status of the allocated processing tasks is updated when a processing status changes. In this way it is ensured that the central node always provides an up-to-date visualization of the current processing status.

Advantageously, different colors, shapes or marks are used for indicating non-allocated or non-processed processing tasks, allocation and processing status of allocated processing tasks, and generated metadata. Furthermore, the metadata are favorably clustered for visualization on the output unit. Both measures ensure that a human reviewer can easily grasp how the processing tasks are allocated and being processed, and what metadata is already available.

Preferably, the processing tasks are related to portions of the digital content, e.g. frames or chunks of a movie, and/or to processing steps of an algorithm. In other words, the processing nodes perform the same operation on different parts of the digital content, or perform one or more steps of a larger operation on the same part of the digital content, or a mixture of both.

Advantageously, the processing speeds of the processing nodes and/or an accumulated processing speed of the processing nodes is determined. This allows to take the performance of the processing nodes into account for the allocation of the processing tasks. For example, a processing node with a higher processing speed may be assigned more demanding processing tasks, whereas a processing node with a lower performance receives less demanding tasks. In this way the processing tasks are smartly distributed and the available equipment is used very efficiently. Furthermore, the accumulated processing speed is suitable for controlling a playback speed of a metadata review process.

Though in the above the invention is described with regard to the generation of metadata, it is likewise suitable for the application of metadata to digital content, e.g. for an automatic restoration of digital content based on previously generated metadata. In this case the application of metadata is split into a plurality of processing tasks, which are allocated to the processing nodes. In addition to the allocation of the processing tasks also the necessary metadata as well as the digital content are distributed to the processing nodes. The modified digital content generated by the processing nodes is then gathered by the maser and visualized on an output unit.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims. In the figures:

DETAILED DESCRIPTION OF PREFERRED EMBODIMENTS

To begin with, a solution for visualizing large data sets shall be described, which is preferably used for supervision of a master process, as will be explained later on.

Figure 1:
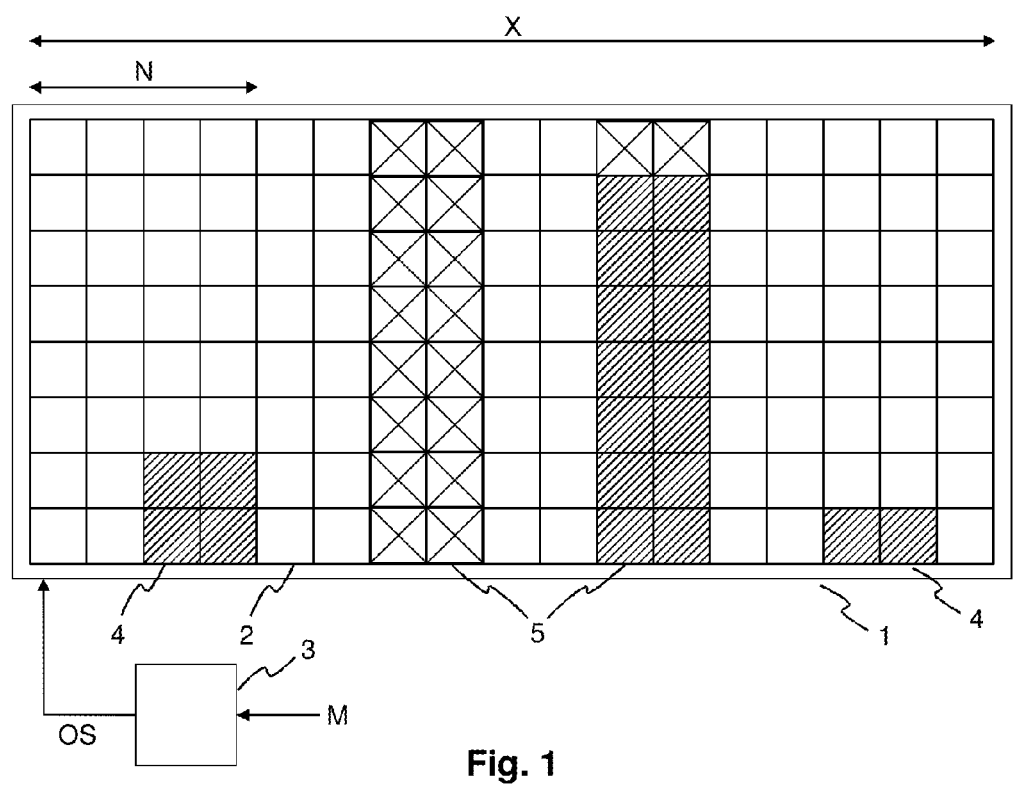
FIG. 1 shows a method for visualizing a data set.

FIG. 1 is a schematic view of an output unit 1 for visualizing a data set. The output unit 1 includes a screen 2, e.g. a TFT display. Of course, the output unit 1 may Likewise be a window of a graphical user interface (GUI). The output unit 1 has a maximum resolution in a horizontal direction of X that is defined by the available horizontal pixels of the screen or the window of the GUI. The output unit 1 is coupled to an apparatus 3 for providing an output signal OS for visualizing a data set. Preferably, the apparatus 3 is a computer, e.g. a personal computer or a work station unit or a part of the same. The output signal OS preferably is a part of a video signal that is provided to the screen 2 by the apparatus 3.

Metadata information, i.e. a metadata vector M of a length S is input to the apparatus 3. The length S of the metadata vector M means that the vector comprises a number of S metadata elements, e.g. a set of metadata comprising a number of S metadata elements. A metadata element may be a single value, e.g. a contrast of a frame, or a set of data, e.g. a contrast and a brightness value. The apparatus 3 is configured to process the metadata vector M for visualization on the output unit 1. The metadata vector M is visualized as a plurality of bars 4, 5, each bar 4, 5 having four horizontal pixels (two dark pixels and two bright pixels), for example. Some bars 5 are highlighted using (illustrated by the pixels with a cross), which indicates that some metadata elements forming the basis for these bars 5 are still missing.

Figure 2:
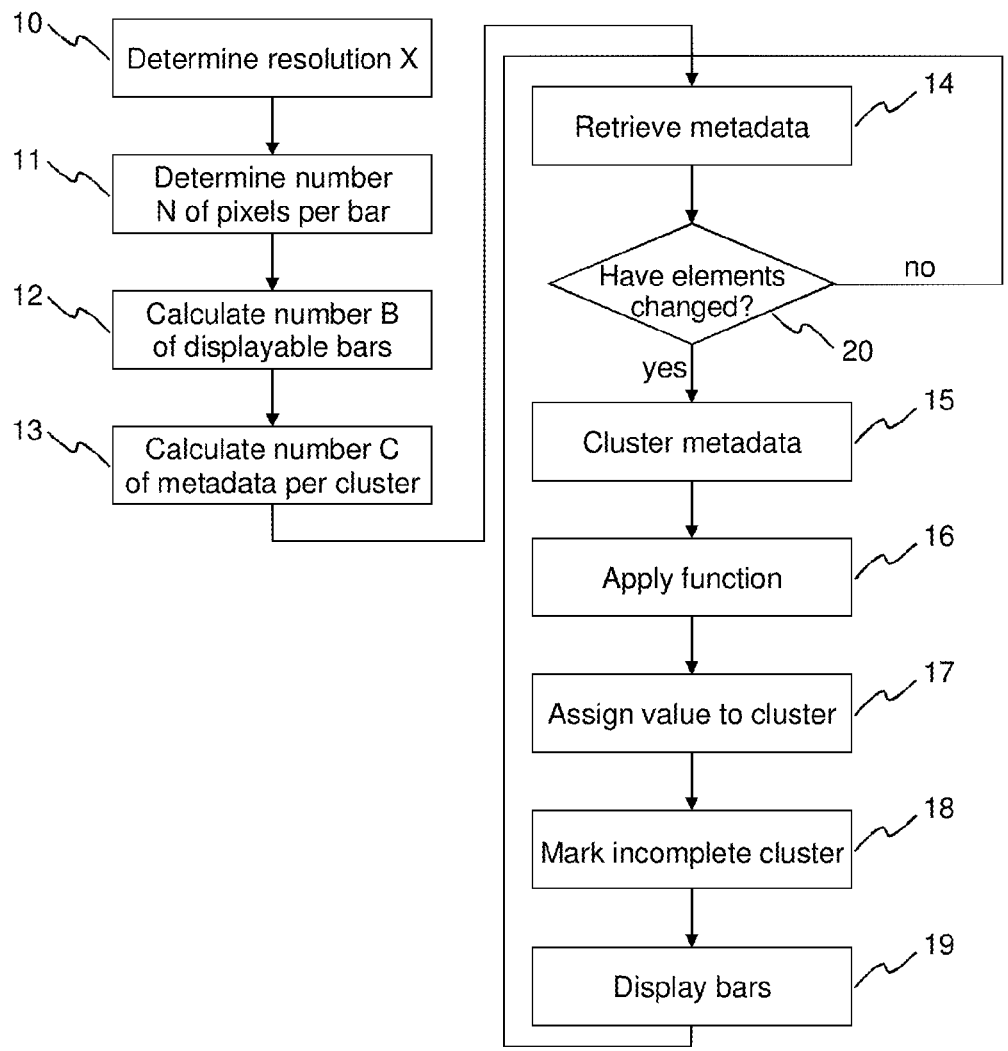
FIG. 2 illustrates a visualization of a data set in accordance with the method of FIG. 1, FIG. 3 schematically depicts a network architecture suitable for implementing a method according to the invention, FIG. 4 schematically illustrates an implementation of a master process.

FIG. 2 schematically illustrates a method for processing the metadata vector M for visualization. In a first step 10 the maximum horizontal resolution X of the output unit 1 is determined. Subsequently, a number N of horizontal pixels per bar 4, 5 is determined 11, e.g. from a user input command. Alternatively, the number N of horizontal pixels per bar 4, 5 is a predetermined value. In a further step 12 the maximum number of displayable bars 8 is determined by calculating B=FLOOR(X/N), wherein FLOOR is a round operation towards negative infinity. When the maximum number B of displayable bars 4, 5 is known, the number of metadata elements that have to be clustered for a single bar is calculated 13 by C=CEIL(S/B), wherein CEIL is a round operation towards positive infinity. Beginning at the first metadata element of a metadata vector M, each element is assigned to a respective cluster. If a remainder of S/B>0 (REM(S, B)>0) exists, the last cluster will have a smaller size than the rest of the clusters. When the actual metadata are retrieved 14, e.g. from a repository, a network, or from an operator, they are clustered 15 into the determined number of clusters. Depending on the operator's input or general specifications, a predetermined function is applied 16 to each metadata element of a respective cluster, e.g. a max-function. Not yet available elements within a cluster are ignored when the function is applied 16. The result of the function is then assigned 17 to the respective cluster. In order to alert the reviewer of missing elements, the uncompleted clusters are marked 18, e.g. through color, texture, markers, or the like. Finally, the value is displayed 19 by the height of the bar. Whenever an element of the metadata vector M changes, i.e. when a missing element becomes available or when an element gets a new value, the desired function is applied again to the corresponding cluster and the display is updated. For this purpose the elements of the metadata vector M are monitored 20. Advantageously the display is updated each time an element changes. Of course, it is likewise possible to update the display only when a defined minimum number of elements have changed, e.g. to avoid too frequent updates. Also, preferably a minimum number of elements is first retrieved before the remaining steps of the method are performed. In this way it is ensured that a meaningful display is made available to the operator. Preferably, the minimum number of elements that need to have changed and/or the number of elements that need to be initially retrieved are settable by the user.

In the following the idea of the present invention is described with reference to a film restoration process. Of course, the idea is likewise applicable to other processes that can be performed in a distributed manner and that deliver displayable results.

Figure 3:
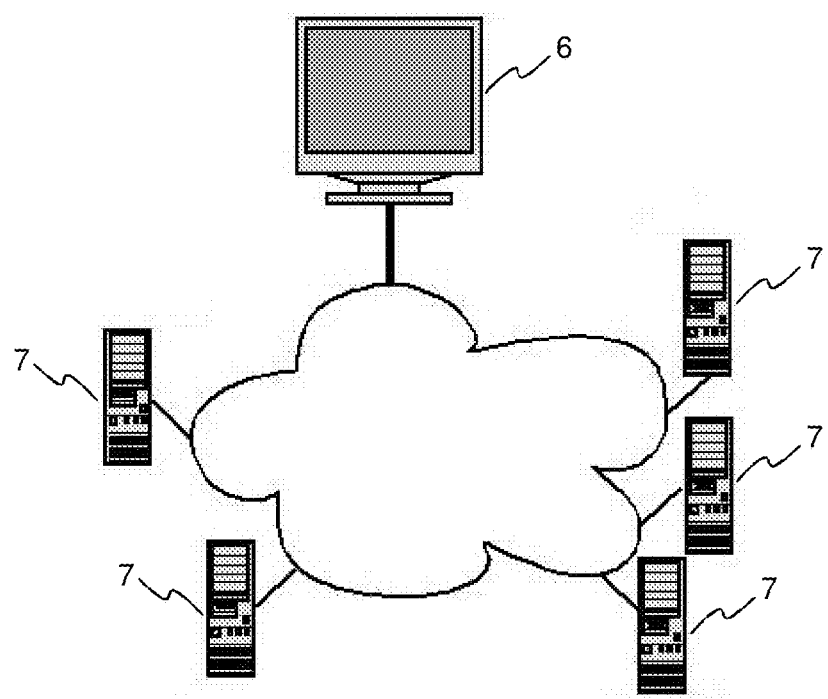

In order to combine the detection and review step of a film restoration process it is necessary to ensure that the detection is sufficiently fast for an acceptable review. Processing digital content for extracting relevant metadata is in general a CPU-intensive and time-consuming task, because of the high complexities of the algorithms applied to the content, or due to a large amount of digital content. For example, a 90 minute movie with 24 frames per second consists of 129600 independent frames, for which metadata needs to be processed. Therefore, the entire processing is split, the partial tasks are distributed to independent processors in a network cloud and processing is performed in parallel. FIG. 3 shows a suitable network architecture. A 'Master' process 6 manages the setup of content, algorithms, processing, etc. A plurality of 'Worker' processes 7 at different processing nodes then perform the processing jobs assigned by the master 6.

In the following it is assumed that the digital content can be split into independent units, e.g. like frames in a movie, and that the employed algorithm can be split into independent processing steps.

The procedure implemented by the workers 7 is quite simple. A worker 7 awaits the allocation of processing jobs by a master 6. When one or more processing jobs have been assigned to the worker 7, the worker 7 processes the job(s). An acknowledge with an indication about a processing speed of the worker 7 is sent to the master 6 when a processing job is finished or when a defined timeout expired. The latter informs the master 6 that the worker 7 is still alive.

The master process 6 has to provide processing jobs to the different worker processes 7. To this end a solution is proposed that splits the processing to (minimal) processing units. Every content unit, e.g. a frame in a movie, is split into processing steps of an algorithm. Combined with the splitting is a smart allocation of processing jobs to the workers 7. The processing jobs can be composed of several processing units. On the one hand, the allocation of just a minimal processing unit to the workers 7 could have the disadvantage that the processing is very ineffective, because of a large management overhead. Also, possibly the algorithms work more efficiently with a longer sequence of movie frames. For example, a motion estimation applied to one frame would at least need to analyze the preceding frame and the subsequent frame. Therefore, for one frame three frames would have to be analyzed. A sequence of ten continuous frames would have a very much better efficiency, as only twelve frames would have to be analyzed for ten frames. On the other hand, too large processing jobs would have the disadvantage that the regular playback (for review) concurrent to the processing would get more difficult. A solution for these issues is an agile composition of minimal processing units to processing jobs, allocated to the workers 2. The composition and size of a processing job are oriented on the performance of the worker 2 and the useful clustering of a content sequence. The next processing job that is allocated to a worker 2 always starts with the unallocated processing unit needed next for playback and review.

Figure 4:
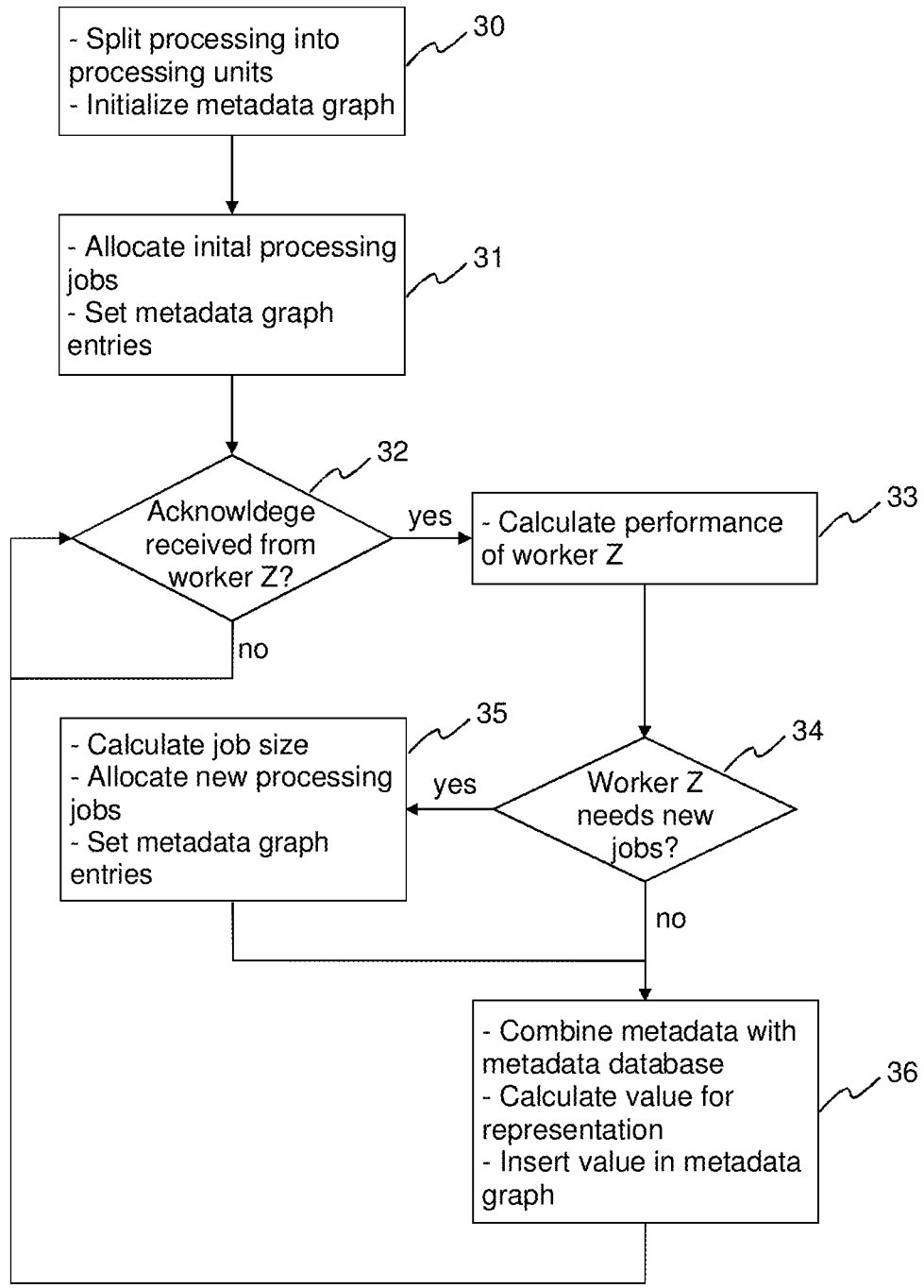

An implementation of the master process 6 is schematically illustrated in FIG. 4. In a first step 30 processing is split into (minimal) processing units. For this purpose the whole digital content is split into content units and the processing algorithms are split into (minimal) processing steps. At the same time the metadata graph is initialized with entries for all processing units as 'unprocessed/unallocated'. In the next step 31 the initial processing jobs are allocated to the workers 7. A processing job can be composed out of several processing units, for example the whole processing algorithm applied to some frames of a movie. The corresponding metadata graph entries of all processing units of the initial processing jobs are then set to 'allocated to worker . . . '. Subsequently it is checked 32 whether an acknowledge for a processing unit or job is received from worker X. Any worker sends an acknowledge, when a processing job is completely finished or when a defined timeframe expired. The acknowledge contains an entry for the progress of the current processing job, which enables the master process 6 to update its progress bar accordingly. The acknowledge also contains an entry for the workers current processing speed. For every worker X, from which an acknowledge has been received, a performance value is then calculated 33. The master process 6 calculates the performance value, e.g. the number of processed frames per second, for every worker from the entry in the acknowledge and/or from a self-measured value between the acknowledges. The next step 34 determines whether worker X needs new processing jobs. After finishing a complete processing job, a new processing job is allocated 35 to the worker. The size of a job that is allocated to the worker X is calculated from a maximum time for a job divided by the performance of the worker X. This ensures that the job is finished after the maximum time for the job. When the new processing jobs are allocated to worker X, an appropriate message is sent to the worker and the metadata graph entries of all processing units of these processing jobs are set to 'allocated to worker X'. Finally, the new metadata provided by the worker X are combined 36 with the metadata database that is managed by the master process 6. Furthermore, a metadata value for the metadata graph representation is determined. In the metadata graph, the metadata value can have different representations, e.g. a preview of the metadata, the metadata itself, . . . . The determined metadata representation is then inserted into the metadata graph.

The above implementation of the master process is not only suitable for the generation of metadata, but also for the application of metadata to digital content, e.g. for an automatic restoration of digital content based on previously generated metadata. In this case the application of metadata is split into a plurality of processing tasks, which are allocated to the processing nodes 7. Of course, in addition to the allocation of the processing tasks also the necessary metadata as well as the digital content need to be distributed to the processing nodes 7. The modified digital content generated by the processing nodes 7 is then gathered by the maser 6 and visualized on an output unit.

Figure 5:
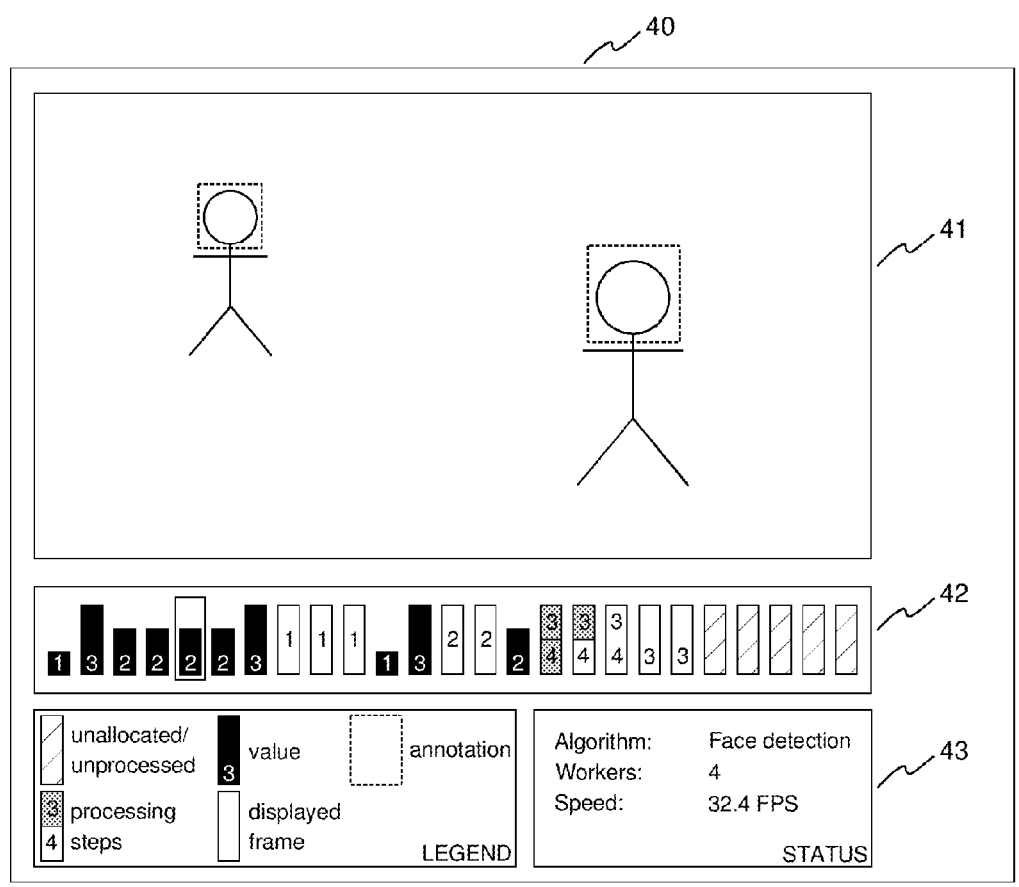
FIG. 5 depicts a user interface of a master process.

A graphical user interface 40 for a master process 6 is shown in FIG. 5. The user interface comprises a display area 41 for the actual video frames including potential metadata annotations, which are indicated by the dashed rectangles. A metadata graph display area 42 gives detailed information about the allocation and processing status of the frames as well as the already available metadata. An information area 43 contains a legend for the metadata graph display area 42 as well as information about the currently performed algorithm, the number of active workers, the processing speed and the like. In the example of FIG. 5 the currently displayed frame is highlighted by a bounding boy in the metadata graph display area 42. Black bars designate the actual metadata values for the corresponding frames, hashed bars represent frames that have not yet been allocated, and white and grey bars represent frames that have been allocated, where a grey bar means that the corresponding processing step is currently being performed. The numbers in the white and grey bars designate the workers to which the processing steps are allocated.

Figure 6:
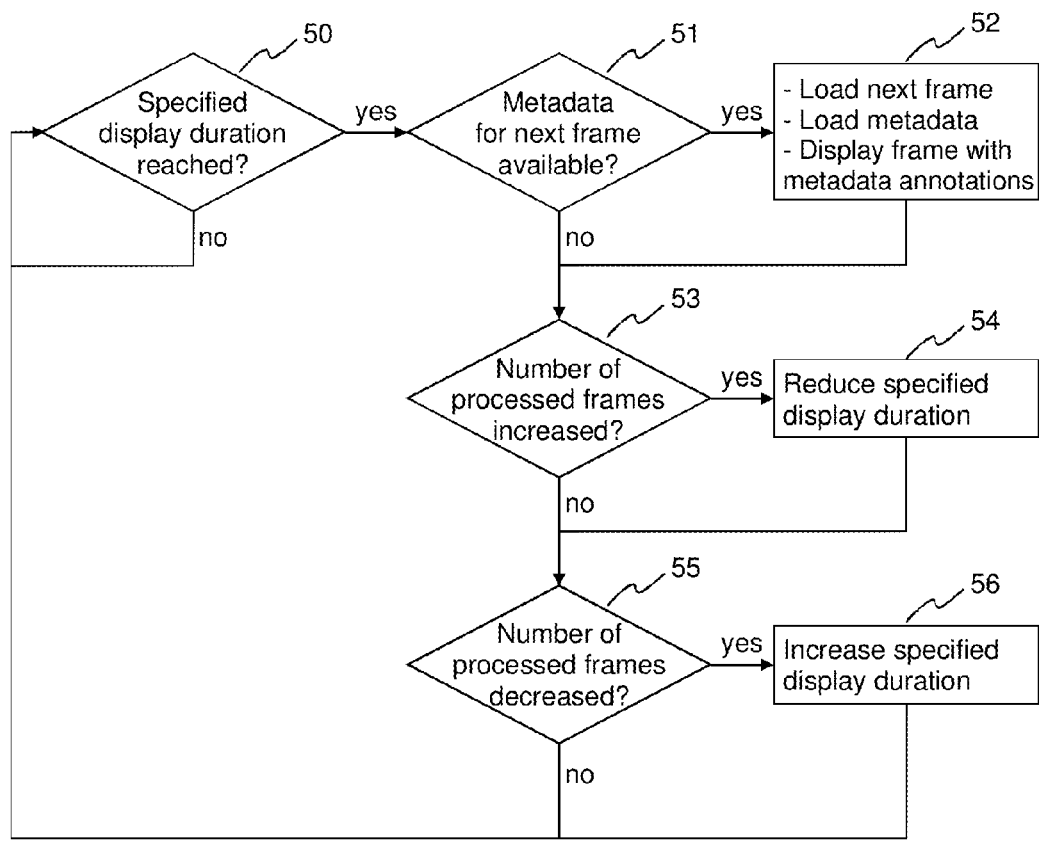
FIG. 6 shows a method for adjusting the playback speed for the master process, and FIG. 7 schematically illustrates an apparatus adapted to perform the master process.

In order to track the results of metadata processing, the content is played back with metadata annotations. Depending on the algorithm, content and worker speed, the processing time can vary. Therefore, the playback speed needs to be adjusted to keep the playback position near to the current processing position. FIG. 6 depicts a method that is suitable for adjusting the playback speed. In a first step 50 it is repeatedly checked whether the currently displayed frame has already been displayed for a specified display duration. Once this is the case, it is checked 51 whether metadata is available for the next frame. If so, the next frame and the associated metadata are loaded 52 and displayed. In a next step 53 it is checked whether the number of processed frames after the current playback position has increased. If so, the specified display duration is reduced 54 in order to accelerate playback. If it has not increased, it is determined 55 whether the number of processed frames after the current playback position has decreased. If so, the specified display duration is increased 56 in order to slow down playback.

Figure 7:
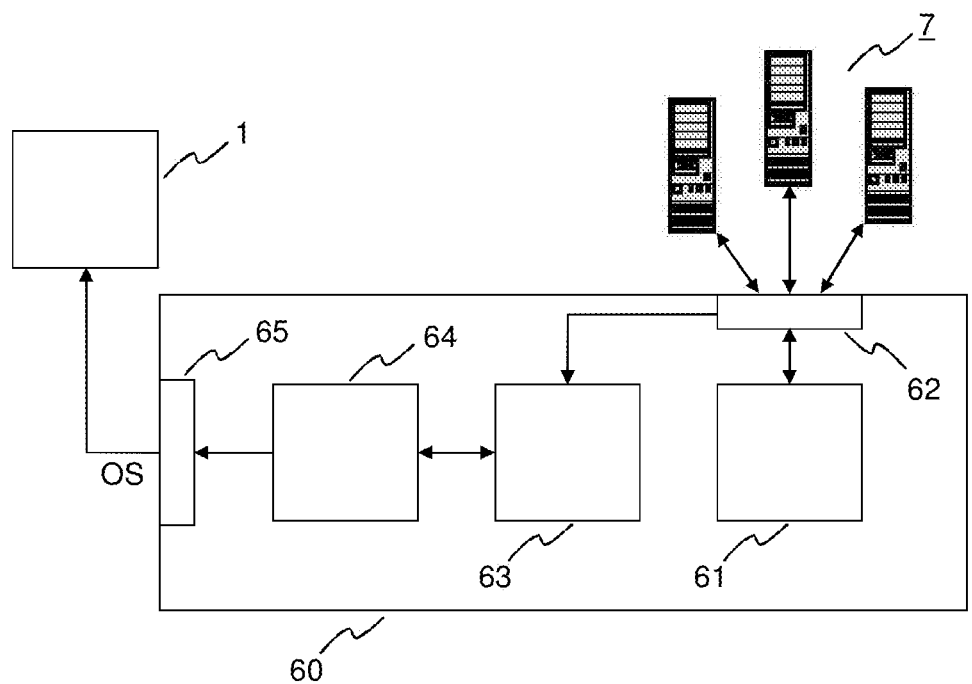

An apparatus 60 adapted to perform the master process 6 is schematically illustrated in FIG. 7. The apparatus 60 comprises a processor 61, which splits the metadata generation into a plurality of processing tasks and which allocates two or more processing tasks of the plurality of processing tasks to two or more processing nodes 7 via an interface 62. A data collector 63 gathers the metadata generated by the two or more processing nodes 7. A visualization controller 64 visualizes the gathered metadata via a further interface 65 on a connected output unit 1. The processor 61 continuously monitors if one or more of the processing nodes 7 have completed their allocated processing tasks and thus need to be provided with further processing tasks.

What is claimed is:

1. A method for generating metadata comprising information about artifacts detected in a digitized film, the method comprising:
   splitting the metadata generation into a plurality of processing tasks;
   allocating two or more processing tasks of the plurality of processing tasks to two or more independent processing nodes in a network, wherein each processing task is allocated to a different processing node;
   receiving an acknowledgement from each of the two or more processing nodes when a defined timeframe has expired or the respective processing node is finished executing its respective assigned processing task, wherein each acknowledgement contains an entry for a progress of the respective processing task and a current processing speed of the respective processing node;
   calculating for each processing node a performance value from the entry in each respective acknowledgement, wherein a size of a processing task allocated to a processing node is determined from the performance value of that processing node and a predefined timeframe for executing the processing task on that processing node at the current processing speed;
   gathering metadata generated by the two or more processing nodes; and
   visualizing the gathered metadata on an output unit.

2. The method according to claim 1, further comprising allocating further processing tasks to a processing node depending on its reported status.

3. The method according to claim 1, further comprising visualizing the allocation of processing tasks or a current processing status of the allocated processing tasks.

4. The method according to claim 1, further comprising updating the visualization of the gathered metadata when further metadata are retrieved, the visualization of the allocation of processing tasks when further processing tasks are allocated, or the visualization of the current processing status of the allocated processing tasks when a processing status changes.

5. The method according to claim 1, wherein different colors, shapes or marks are used for indicating non-allocated or non-processed processing tasks, allocation and processing status of allocated processing tasks, and generated metadata.

6. The method according to claim 1, wherein the processing tasks are related to portions of the digitized film or to processing steps of an algorithm.

7. The method according to claim 6, wherein the portions of the digitized film are frames or chunks of a movie.

8. The method according to claim 1, further comprising clustering metadata for visualization on the output unit.

9. The method according to claim 1, further comprising determining an accumulated processing speed of the processing nodes.

10. The method according to claim 9, further comprising controlling a playback speed of a metadata review process based on the accumulated processing speed.

11. The method according to claim 1, further comprising enabling manual navigation through the gathered metadata or the digitized film for review of the metadata.

12. An apparatus configured to generate metadata comprising information about artifacts detected in a digitized film, the apparatus comprising:
   a processor configured to:
      split the metadata generation into a plurality of processing tasks and to allocate two or more processing tasks of the plurality of processing tasks to two or more independent processing nodes in a network, wherein each processing task is allocated to a different processing node, wherein the apparatus receives an acknowledgement from each of the two or more processing nodes when a defined timeframe has expired or the respective processing node is finished executing its respective assigned processing task, and wherein each acknowledgement contains an entry for a progress of the respective processing task and a current processing speed of the respective processing node, and calculate for each processing node a performance value from the entry in each respective acknowledgement, wherein a size of a processing task allocated to a processing node is determined from the performance value of that processing node and a predefined timeframe for executing the processing task on that processing node at the current processing speed;

a data collector configured to gather metadata generated by the two or more processing nodes; and a visualization controller configured to visualize the gathered metadata on an output unit.

13. The apparatus according to claim 12, wherein the processor is further configured to allocate further processing tasks to a processing node depending on its reported status.

14. The apparatus according to claim 12, wherein the visualization controller is further configured to visualize the allocation of processing tasks or a current processing status of the allocated processing tasks.

15. The apparatus according to claim 12, wherein the visualization controller is further configured to update the visualization of the gathered metadata when further metadata are retrieved, the visualization of the allocation of processing tasks when further processing tasks are allocated, or the visualization of the current processing status of the allocated processing tasks when a processing status changes.

16. The apparatus according to claim 12, wherein the visualization controller is further configured to use different colors, shapes or marks for indicating non-allocated or non-processed processing tasks, allocation and processing status of allocated processing tasks, and generated metadata.

17. The apparatus according to claim 12, wherein the processing tasks are related to portions of the digitized film or to processing steps of an algorithm.

18. The apparatus according to claim 17, wherein the portions of the digitized film are frames or chunks of a movie.

19. The apparatus according to claim 12, wherein the visualization controller is further configured to cluster metadata for visualization on the output unit.

20. The apparatus according to claim 12, wherein the processor is further configured to determine an accumulated processing speed of the processing nodes.

21. The apparatus according to claim 20, wherein the visualization controller is further configured to control a playback speed of a metadata review process based on the accumulated processing speed.

22. The apparatus according to claim 12, wherein the visualization controller is further configured to enable manual navigation through the gathered metadata or the digitized film for review of the metadata.

23. A method for applying metadata comprising information about artifacts detected in a digitized film for restoration of the digitized film, the method comprising:

splitting the application of the metadata into a plurality of processing tasks;

allocating two or more processing tasks of the plurality of processing tasks to two or more independent processing nodes in a network, wherein each processing task is allocated to a different processing node;

receiving an acknowledgement from each of the two or more processing nodes when a defined timeframe has expired or the respective processing node is finished executing its respective assigned processing task, wherein each acknowledgement contains an entry for a progress of the respective processing task and a current processing speed of the respective processing node;

calculating for each processing node a performance value from the entry in each respective acknowledgement, wherein a size of a processing task allocated to a processing node is determined from the performance value of that processing node and a predefined timeframe for executing the processing task on that processing node at the current processing speed; and distributing the metadata to the two or more processing nodes.

24. The method according to claim 23, further comprising:

gathering restored digitized film generated by the two or more processing nodes; and visualizing the restored digitized film on an output unit.

25. An apparatus configured to apply metadata comprising information about artifacts detected in a digitized film for restoration of the digitized film, the apparatus comprising a processor configured to:

split the application of the metadata into a plurality of processing tasks, allocate two or more processing tasks of the plurality of processing tasks to two or more independent processing nodes in a network wherein each processing task is allocated to a different processing node, wherein the apparatus receives an acknowledgement from each of the two or more processing nodes when a defined timeframe has expired or the respective processing node is finished executing its respective assigned processing task, and wherein each acknowledgement contains an entry for a progress of the respective processing task and a current processing speed of the respective processing node, calculate for each processing node a performance value from the entry in each respective acknowledgement, and distribute the metadata to the two or more processing nodes, wherein a size of a processing task allocated to a processing node is determined from the performance value of that processing node and a predefined timeframe for executing the processing task on that processing node at the current processing speed.

26. The apparatus according to claim 25, further comprising:

a data collector configured to gather restored digitized film generated by the two or more processing nodes; and an output unit configured to visualize the restored digitized film.

* * * * *